United States Patent
Ohbuchi et al.

(10) Patent No.: US 9,516,399 B2
(45) Date of Patent: Dec. 6, 2016

(54) WIRELESS MICROPHONE SYSTEM AND TRANSMISSION POWER CONTROL METHOD

(71) Applicant: Panasonic Intellectual Property Management Co., Ltd., Osaka (JP)

(72) Inventors: Ken Ohbuchi, Fukuoka (JP); Takashi Yamamoto, Fukuoka (JP); Kouji Yoshida, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 171 days.

(21) Appl. No.: 14/475,338

(22) Filed: Sep. 2, 2014

(65) Prior Publication Data

US 2015/0063604 A1    Mar. 5, 2015

(30) Foreign Application Priority Data

Sep. 4, 2013   (JP) ................................. 2013-182890

(51) Int. Cl.
*H04R 3/00* (2006.01)
*H04R 1/08* (2006.01)
*H04W 52/24* (2009.01)

(52) U.S. Cl.
CPC ............ *H04R 1/08* (2013.01); *H04W 52/242* (2013.01); *H04W 52/245* (2013.01); *H04R 3/005* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 6,983,164 B2 | 1/2006 | Kajimura | |
| 2001/0023189 A1 | 9/2001 | Kajimura | |
| 2001/0055984 A1* | 12/2001 | Kawasaki et al. | 455/569 |
| 2002/0197957 A1* | 12/2002 | Kawasaki et al. | 455/42 |
| 2009/0052713 A1* | 2/2009 | Abe | 381/355 |
| 2012/0106751 A1* | 5/2012 | Li et al. | 381/77 |
| 2012/0108282 A1* | 5/2012 | Li et al. | 455/509 |
| 2012/0114134 A1* | 5/2012 | Li et al. | 381/77 |
| 2012/0177217 A1* | 7/2012 | Schmidt et al. | 381/80 |
| 2012/0224713 A1* | 9/2012 | Schmidt et al. | 381/77 |

FOREIGN PATENT DOCUMENTS

| | | |
|---|---|---|
| JP | 2001-332987 A | 11/2001 |
| JP | 2002-345026 A | 11/2002 |

* cited by examiner

*Primary Examiner* — Thang Tran
(74) *Attorney, Agent, or Firm* — Seed IP Law Group PLLC (57) ABSTRACT

A wireless communication apparatus and transmission power control method are disclosed, which can sustain communication with all microphone handsets while avoiding an increase in radio interference to another radio communication system as much as possible when radio communication is performed with a plurality of microphone handsets. In the wireless communication apparatus, a level measurement section measures an RSSI level of a call signal each time the base unit receives a call signal from each microphone handset; and a transmission power control section controls an amplification section so that a transmission power value is determined at a predetermined timing using a minimum value of the RSSI levels of the respective microphone handsets, and that a control signal is transmitted to the microphone handsets with the determined transmission power value.

7 Claims, 6 Drawing Sheets

| MICROPHONE HANDSET ID NUMBER | RSSI LEVEL | RECEPTION TIME |
|---|---|---|
| ID1 | Ppp1 | Tpp1 |
| ID2 | Ppp2 | Tpp2 |
| ID3 | Ppp3 | Tpp3 |
| ... | ... | ... |
| IDn | Pppn | Tppn |

WIRELESS MICROPHONE SYSTEM AND TRANSMISSION POWER CONTROL METHOD

CROSS REFERENCE TO RELATED APPLICATIONS

This application is entitled to the benefit of Japanese Patent Application No. 2013-182890 filed on Sep. 4, 2013, the disclosure of which including the specification, drawings and abstract is incorporated herein by reference in its entirety.

TECHNICAL FIELD

The present invention relates to a wireless microphone system and a transmission power control method for the wireless microphone system. The wireless microphone system includes a base unit and a plurality of microphone handsets each transmitting a voice signal to the base unit via a radio link based on the synchronization timing established between the microphone handset and this base unit.

BACKGROUND ART

Wireless microphone systems configured to transmit voice via radio waves require no cable to connect a microphone handset and a base unit (microphone amplifier) together, so that they can be used flexibly in various use environments. For this reason, such wireless microphone systems are used in various places such as public and private facilities, various school facilities, and stores, for example. Of these wireless microphone systems, there is known a wireless microphone system configured to transmit digital voice data from a microphone to a base unit. In a case where a plurality of radio communication systems including this wireless microphone system exist within the same area, transmission of radio waves from a base unit to a microphone handset using maximum transmission power always enables communication even when the base unit and microphone handset are distant from each other. In this case, however, there is a problem in that the transmission of radio waves using the maximum transmission power always causes an increase in interference to other radio communication systems.

Given this, there have been developed radio communication systems configured to variably control the transmission power of the base units. For example, Japanese Patent Application Laid-Open No. 2001-332987 (hereinafter, referred to as "PTL 1") discloses a technique that sets the optimum transmission power by controlling transmission power such that the transmission power value of a radio communication apparatus is made the maximum value at the start of communication, then reduced by a predetermined amount each time transmission succeeds, and raised by a predetermined amount when transmission fails, for example.

Japanese Patent Application Laid-Open No. 2002-345026 (hereinafter, referred to as "PTL 2") discloses a technique that controls the transmission power of the base unit (connection apparatus) according to whether or not a handset is linked to a charging cradle. That is, PTL 2 discloses the technique that performs communication with a low transmission power when the handset is linked to the charging cradle and that performs communication with a high transmission power when the handset is removed from the charging cradle. Thus, the technique disclosed in PTL 2 makes it possible to sustain the communication between a handset and a connection apparatus even if an interfering signal is received while the handset moves away from the connection apparatus.

CITATION LIST

Patent Literature

PTL 1
Japanese Patent Application Laid-Open No. 2001-332987
PTL 2
Japanese Patent Application Laid-Open No. 2002-345026

SUMMARY OF INVENTION

Technical Problem

PTL 1 is, however, the technique for controlling the power between the handset and the base unit to be low during a call (or during other data communication), and is not for power control of the control channel for synchronization and transmission of a control signal between a base unit and a handset in a situation other than during a call. Likewise, PTL 2 is an invention related to a control between one handset and a base unit, and cannot be applied when a plurality of handsets exist. Additionally, the above-noted related art does not consider interference by a control channel signal with respect to another radio communication system.

Figure 1:
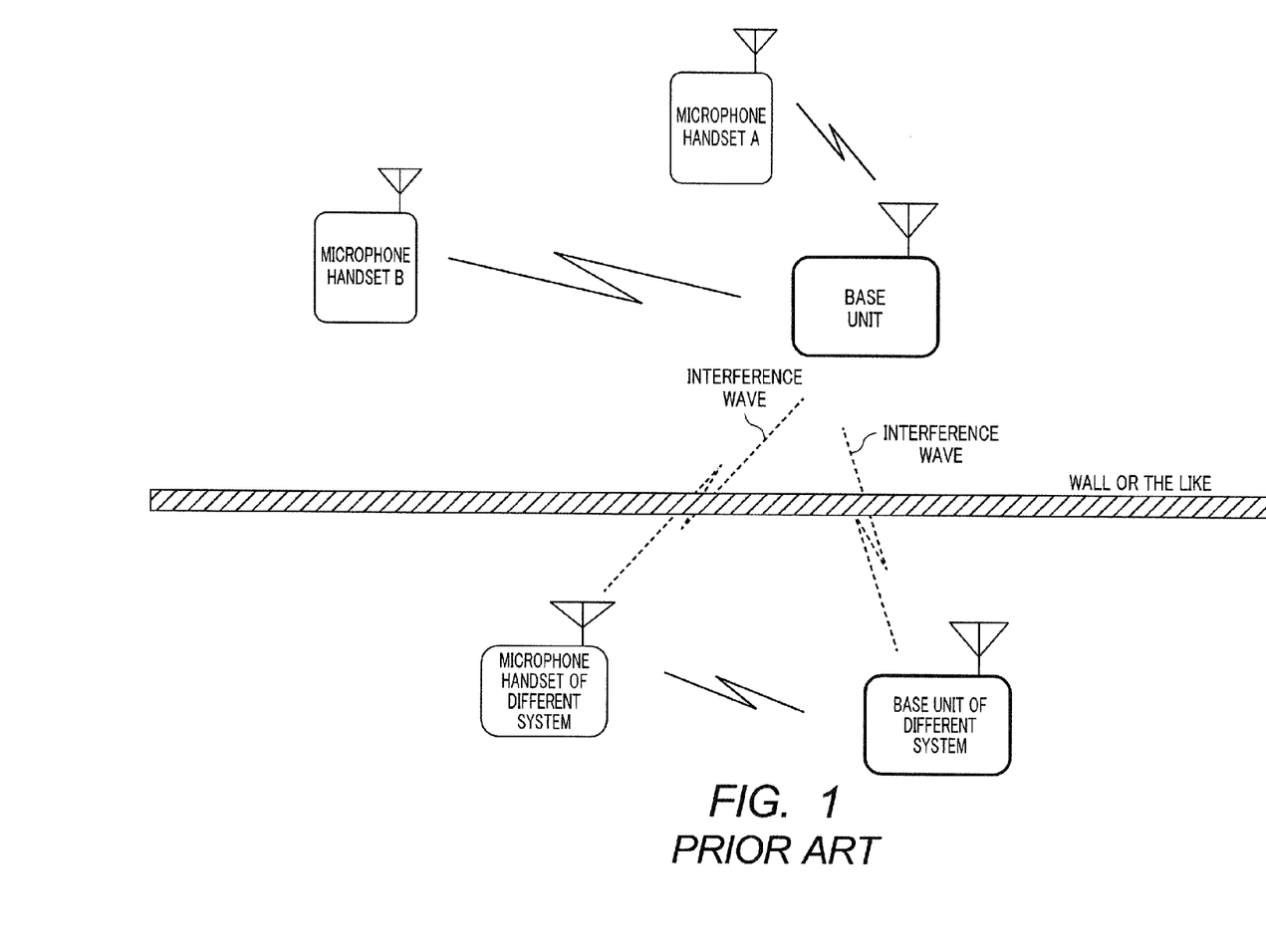
FIG. 1 is a diagram illustrating how interference with respect to another nearby radio communication system occurs.

FIG. 1 illustrates how interference with respect to another nearby radio communication system occurs. As illustrated in FIG. 1, if there are a plurality of handsets (handsets A and B) registered to a base unit, and if the power on the control channel on which the base unit performs transmission is made maximum to enable reception at handset B, which is distant from the base unit, there is a risk of significant interference with respect to another nearby radio communication system.

PTL 2 discloses a connection apparatus making the transmission power low when one handset having the same terminal number as the connection apparatus is linked to a charging cradle, but does not disclose anything about transmission power control of a control signal when a plurality of handsets having the same terminal number as the connection apparatus exist. For example, if the base unit reduces the transmission power of the control signal when a nearby handset is placed onto a charging cradle, there is a risk that communication between a distant handset and the base unit will be disconnected.

An object of the present invention is to provide a wireless microphone system and a transmission power control method that can sustain communication with all the microphone handsets while avoiding an increase in radio interference to another radio communication system as much as possible when a base unit performs radio communication with a plurality of microphone handsets.

Solution to Problem

A wireless microphone system according to an aspect of the present invention includes: a plurality of microphone handsets; and a base unit that performs time division multiple access (TDMA) based radio communication with the plurality of microphone handsets, in which the base unit includes: a level measurement section that measures a reception level of a signal transmitted from each of the microphone handsets; and a transmission power control section that determines a transmission power value in accordance with a minimum value of the reception levels and that controls transmission power so that a predetermined signal is transmitted to the plurality of microphone handsets with the determined transmission power value using a predetermined channel.

A transmission power control method according to an aspect of the present invention is a method for a wireless microphone system including: a plurality of microphone handsets; and a base unit that performs time division multiple access (TDMA) based radio communication with the plurality of microphone handsets, the method including: measuring by the base unit, a reception level of a signal transmitted from each of the microphone handsets; and determining by the base unit, a transmission power value in accordance with a minimum value of the reception levels, and controlling transmission power by the base unit so that a predetermined signal is transmitted to the plurality of microphone handsets with the determined transmission power value using a predetermined channel.

Advantageous Effects of Invention

According to the present invention, when performing TDMA-based radio communication with a plurality of microphone handsets, a base unit can control transmission power in a way that sets the received signal level of a microphone handset far from the base unit to an extent that slightly exceeds a predetermined threshold allowing the microphone handset to sustain communication. Thus, it is possible to sustain communication with all the microphone handsets while avoiding an increase in radio interference to a plurality of other radio communication systems as much as possible.

DESCRIPTION OF EMBODIMENT

Hereinafter, a detailed description will be given of an embodiment of the present invention with reference to the drawings. In the following, a wireless microphone system conforming to the DECT (Digital Enhanced Cordless Telecommunication) standard is described as an example. DECT is a system that has been established as a standard by ETSI (European Telecommunications Standards Institute), which is a telecommunications standardization organization in Europe.

Embodiment

Figure 2:
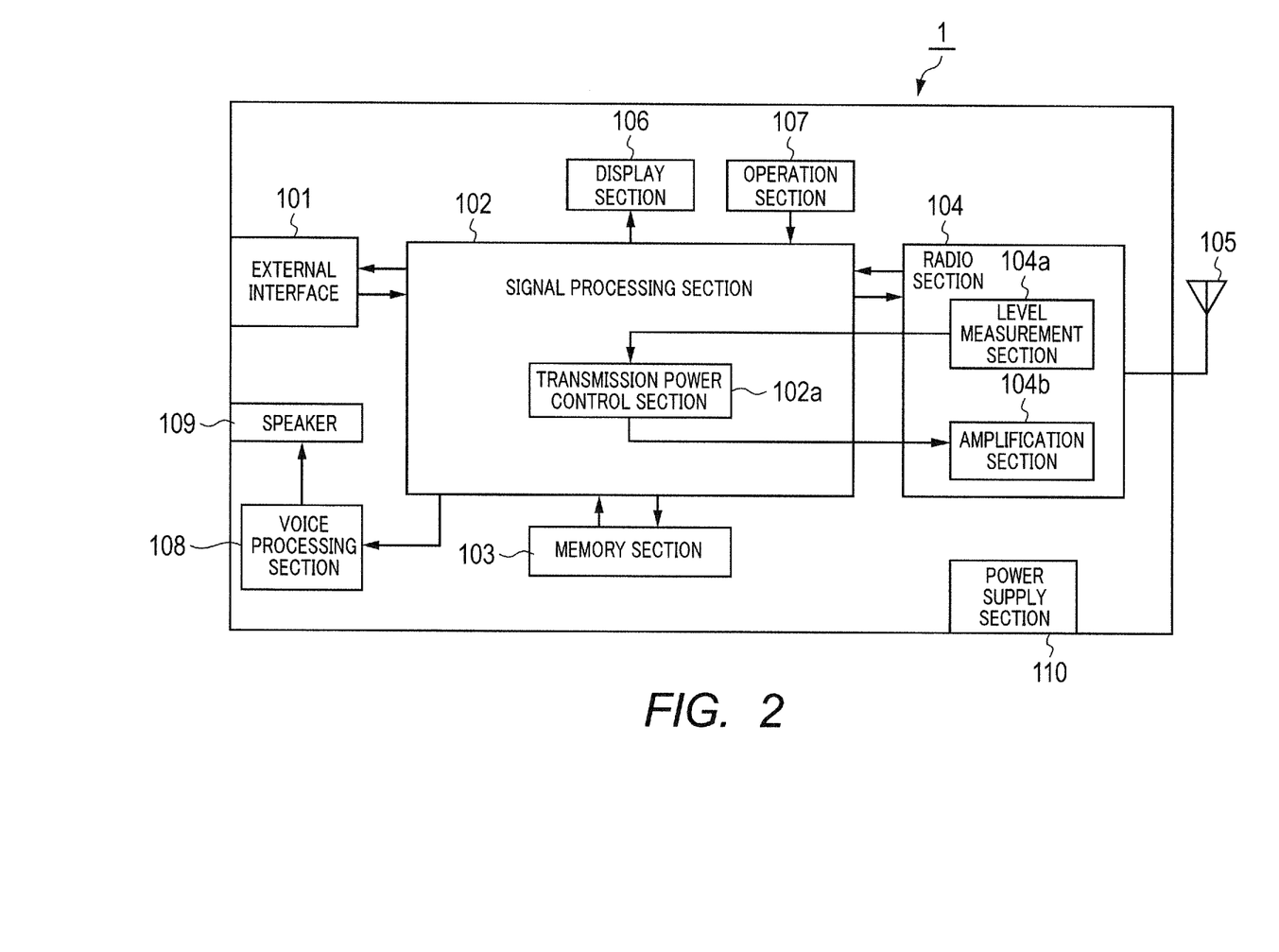
FIG. 2 is a block diagram illustrating the configuration of a base unit according to an embodiment of the present invention.
Figure 3:
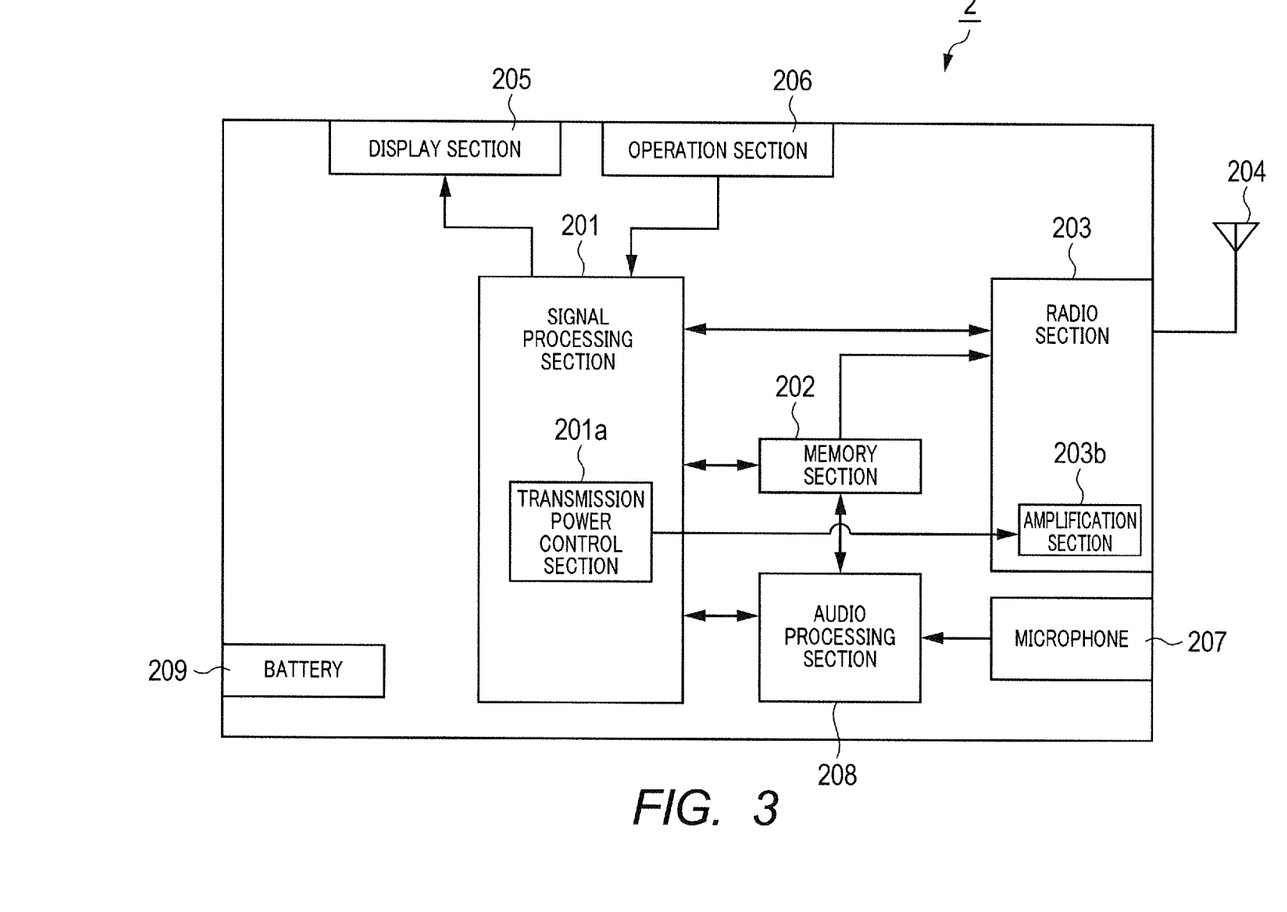
FIG. 3 is a block diagram illustrating the configuration of a microphone handset according to an embodiment of the present invention.

The wireless microphone system includes one base unit 1 (refer to FIG. 2), and a plurality microphone handsets 2 (refer to FIG. 3). Base unit 1 (microphone amplifier) performs TDMA (Time Division Multiple Access) based radio communication with each microphone handset 2.

FIG. 2 is a block diagram illustrating the configuration of base unit 1 according to an embodiment of the present invention. As illustrated in FIG. 2, base unit 1 mainly includes external interface 101, signal processing section 102, memory section 103, radio section 104, antenna 105, display section 106, operation section 107, voice processing section 108, speaker 109 (or speaker output section), and power supply section 110.

External interface 101 is an interface for connecting an external device with signal processing section 102, and is configured to make connection with an external device and to extend functions. Base unit 1 receives a voice signal from microphone handset 2 via a radio link. Accordingly, microphone handset 2 can transmit the voice signal through a telephone line via base unit 1. It should be noted that, external interface 101 may be connected to a network such as the Internet and can transmit a voice signal via the network in this case.

Signal processing section 102 processes a signal outputted from each section and also controls each section based on a control program stored in memory section 103. More particularly, signal processing section 102 demodulates a received baseband signal, extracts control data and voice encoded data from a predetermined slot within the frame, and performs decoding processing such as the ADPCM (Adaptive Differential Pulse Code Modulation) system or the like on the voice encoded data to generate digital voice data.

Memory section 103 stores predetermined information such as a control program and IDs (identifications) of microphone handsets. Of the information stored in memory section 103, the parts that are related to the present invention will be described, hereinafter.

Radio section 104 performs radio processing such as amplification and up-conversion on the baseband digital signal outputted from signal processing section 102 and transmits a radio signal from antenna 105. More particularly, radio section 104 transmits, to microphone handsets 2 via antenna 105, a control signal indicating a result of transmission power calculation outputted from transmission power control section 102a (to be described, hereinafter). In addition, radio section 104 performs radio processing such as amplification and down-conversion on a radio signal received via antenna 105 and outputs a baseband digital signal to signal processing section 102.

Display section (LCD: liquid crystal display) 106 displays various information outputted from signal processing section 102. Operation section 107 includes various buttons, dials, and keys and converts operation contents based on user intention to electrical signals and outputs the resultant signals to signal processing section 102.

Voice processing section 108 performs specific-voice-frequency emphasis processing (restoration of frequency components removed during the filtering process of the microphone voice processing section of microphone handset 2) on the digital voice data outputted from signal processing section 102 and/or decoding the digital voice data when the digital voice data is encoded, for example. Voice processing section 108 performs processing such as digital to analog conversion and amplification or the like on the digital voice data and outputs the obtained analog voice signal to speaker 109. Speaker 109 converts the analog voice signal outputted from voice processing section 108 to a voice sound and outputs the voice sound. Power supply section 110 receives, as input, power supplied from an AC power supply or AC adapter and supplies power to each section of base unit 1. Note that, power supply section 110 may be a battery.

As a characteristic configuration of the present invention, signal processing section 102 includes transmission power control section 102a. Likewise, radio section 104 includes level measurement section 104a and amplification section 104b.

Transmission power control section 102a calculates transmission power based on the RSSI (Received Signal Strength Indicator) level of the received signal from each microphone handset 2 that is measured by level measurement section 104a, and the currently determined transmission level, and outputs a control signal indicating the result of calculation to amplification section 104b of radio section 104. Note that, the specific transmission power control method in transmission power control section 102a will be described, hereinafter.

Level measurement section 104a measures the RSSI level of the received signal from each microphone handset 2 during a call or during a synchronization establishment process and outputs an RSSI signal indicating the result of measurement to transmission power control section 102a.

Amplification section 104b amplifies the power of the radio signal transmitted from antenna 105, based on control by transmission power control section 102a.

FIG. 3 is a block diagram illustrating the configuration of microphone handset 2 according to an embodiment of the present invention. As illustrated in FIG. 3, microphone handset 2 mainly includes signal processing section 201, memory section 202, radio section 203, antenna 204, display section 205, operation section 206, microphone 207, voice processing section 208, and battery 209.

Signal processing section 201 processes a signal outputted from each section and also controls each section based on a control program stored in memory section 202. More particularly, signal processing section 201 performs encoding processing such as the ADPCM (Adaptive Differential Pulse Code Modulation) system or the like on the digital voice data, adds control data, then puts the data in a predetermined slot of a frame, and performs modulation processing such as frequency modulation to generate a baseband digital signal.

Memory section 202 stores predetermined information such as a control program.

Radio section 203 performs radio processing such as amplification and up-conversion on the baseband digital signal outputted from signal processing section 201 and transmits a radio signal from antenna 204. Radio section 203 also performs radio processing such as amplification and down-conversion on the radio signal received via antenna 204 and outputs a baseband digital signal to signal processing section 201.

Display section 205 displays various information outputted from signal processing section 201. Operation section 206 has various buttons, dials, and keys, and converts operation contents based on user intention to electrical signals and outputs the resultant signals to signal processing section 201.

Microphone 207 collects sounds from a user's voice, converts the collected sounds to an analog voice signal and outputs the signal to voice processing section 208. Voice processing section 208 performs processing such as analog to digital conversion and amplification on the analog voice signal outputted from microphone 207 and outputs the digital voice data to signal processing section 201. Battery 209 supplies power to each section of microphone handset 2.

As a characteristic configuration of the present invention, signal processing section 201 includes transmission power control section 201a. Likewise, radio section 203 includes amplification section 203b.

Transmission power control section 201a outputs a control signal indicating the calculation result of transmission power transmitted from base unit 1 to amplification section 203b.

Amplification section 203b amplifies the power of the radio signal transmitted from antenna 204, based on control by transmission power control section 201.

Next, DECT-based communication between base unit 1 and microphone handset 2 in the standby state will be described using FIG. 4.

Figure 4:
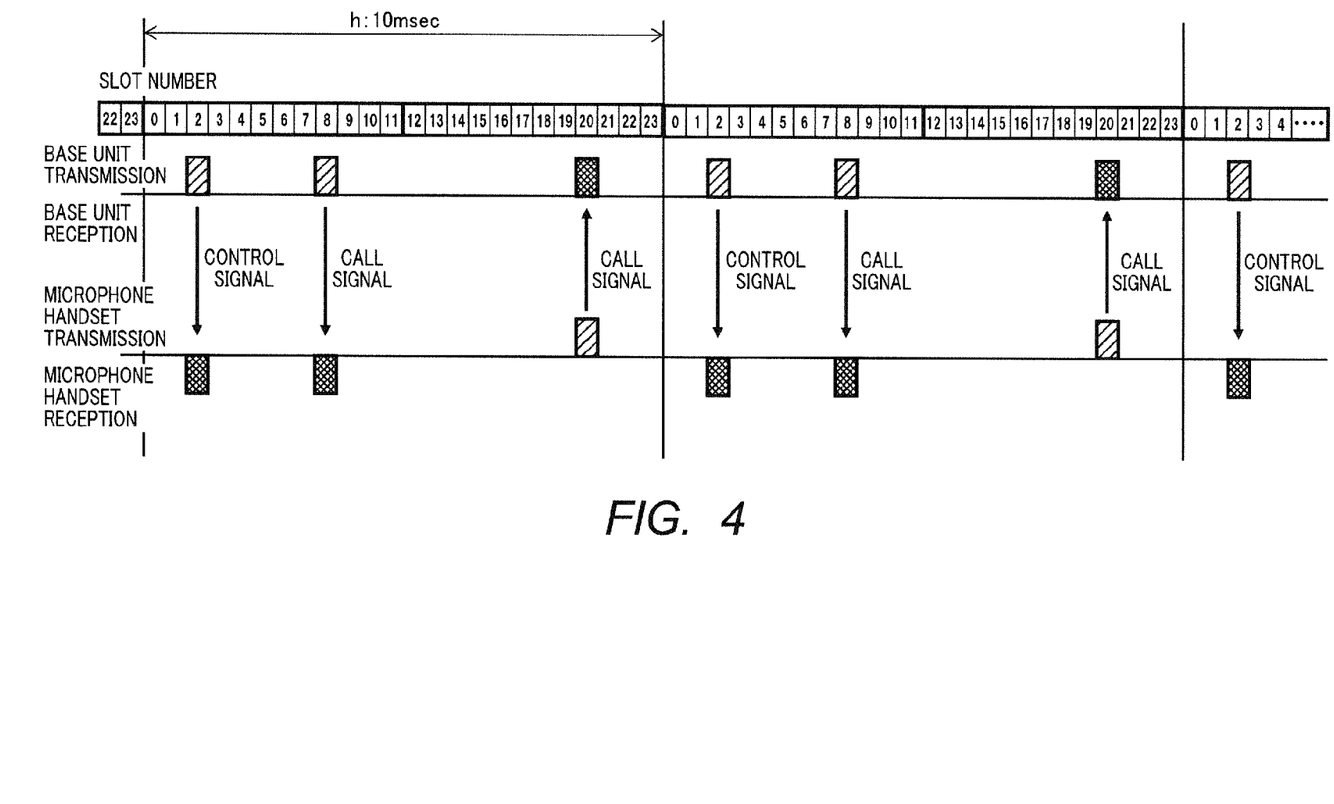
FIG. 4 is a diagram provided for describing how DECT-based communication is performed between a base unit and a microphone handset in the standby state.

As illustrated in FIG. 4, the DECT system adopts a TDMA/TDD (Time Division Multiple Access/Time Division Duplex) system including 24 slots (12 slots for the uplink and 12 slots for the downlink) in one frame with a period of 10 ms. At least one slot is provided as a control channel slot, and the control channel and calling channel are both transmitted and received with a frame period of 10 ms.

Base unit 1 determines a given slot that is pre-determined in each slot to be a control channel for microphone handset 2 (e.g., the 2nd slot in FIG. 4) and transmits a control signal (beacon) on this control channel. In addition, base unit 1 transmits a call signal (i.e., signal including voice data) in a given slot that is pre-determined for microphone handset 2 (e.g., the 8th slot in FIG. 4) after establishment of synchronization with microphone handset 2. This call signal notifies microphone handset 2 of information indicating a radio error status in base unit 1 or control information such as switching between slots due to radio interference. In addition, in the case of a system in which base unit 1 and microphone handset 2 perform bi-directional voice communication such as a case where an external device and microphone handset 2 communicate with each other using an external IF, for example, this call signal delivers a voice signal from base unit 1 to microphone handset 2.

Microphone handset 2 transmits a call signal (i.e., signal including voice data) in a given slot that is pre-determined for base unit 1 (e.g., the 20th slot in FIG. 4) after establishment of synchronization with base unit 1. Note that, microphone handset 2 may transmit a control signal to base unit 1 in a given slot.

Base unit 1 of the present embodiment measures an RSSI level of the call signal transmitted from each microphone handset 2 and controls the transmission power of the control signal based on the result of measurement. Moreover, base unit 1 controls transmission power for each microphone handset 2 to transmit a call signal with the determined transmission power value. Each microphone handset 2 controls the transmission power of the call signal in accordance with the control by base unit 1.

Figure 5:
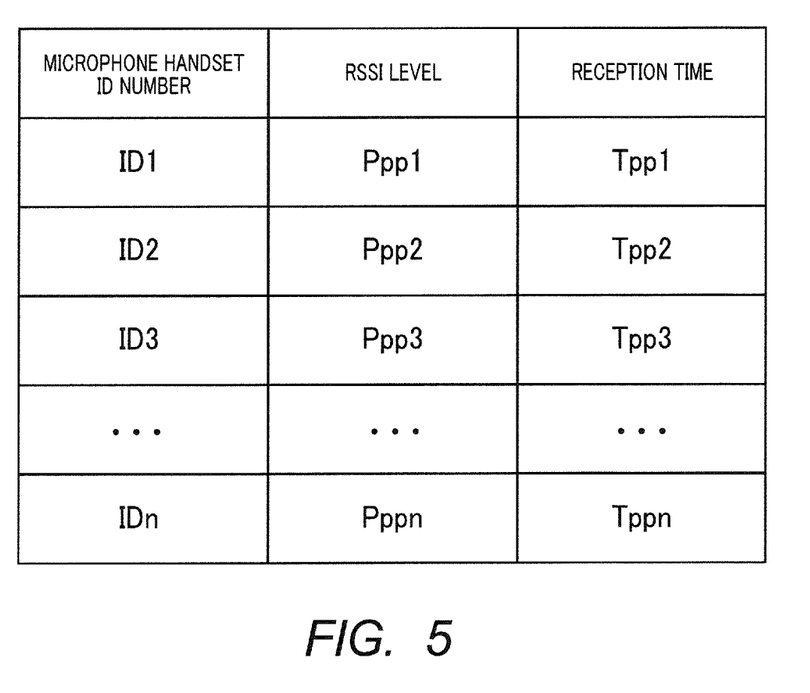
FIG. 5 is a diagram illustrating information stored in a memory section of a base unit according to an embodiment of the present invention.

Next, the information stored in memory section 103 of base unit 1 will be described using FIG. 5. As illustrated in FIG. 5, for each microphone handset 2, memory section 103 of base unit 1 stores, in association with one another, the ID number ($ID_i$) of the microphone handset, the measured RSSI level ($Ppp_i$) of the call signal, and the time ($Tpp_i$) of receiving the call signal.

Each time base unit 1 receives a call signal from each microphone handset 2, level measurement section 104a measures the RSSI level of the call signal and outputs the result of measurement to signal processing section 102 (i.e., transmission power control section 102a).

Upon reception of a call signal from any microphone handset 2, signal processing section 102 stores the ID of corresponding microphone handset 2, the RSSI level, and the time of receiving the call signal in association with one another in memory section 103.

Next, the transmission power control method used when base unit 1 according to the present embodiment transmits a control signal on the control channel will be described.

Transmission power control section 102a calculates at a predetermined timing the transmission power value using a minimum value among RSSI levels ($Ppp_i$) stored in memory section 103. The timing for transmission power control section 102a to control transmission power can be, for example, the timing at which the contents of information stored in memory section 103 illustrated in FIG. 5 are updated.

More specifically, transmission power control section 102a reads the RSSI levels ($Ppp_i$) stored in memory section 103 when the call signals transmitted respectively from microphone handsets 2 are received, and selects the minimum value from among the RSSI levels. The transmission power value of each microphone handset 2 that can communicate with base unit 1 is set, at the start of communication, to the transmission power value used during the last communication, and base unit 1 knows the transmission power value. Alternatively, base unit 1 may be configured to know the transmission power value used for each microphone handset 2 at the start of communication beforehand. Moreover, each microphone handset 2 may be configured to report its transmission power value to base unit 1 at establishment of synchronization or at the start of communication.

In the present embodiment, the amplification of amplification section 104b for transmission of a control signal is controlled to suit microphone handset 2 whose received signal level is the weakest. More specifically, base unit 1 reads, from information stored in memory section 103, the RSSI level (minimum RSSI level) corresponding to microphone handset 2 whose received signal is the weakest and subtracts the minimum RSSI level ($Ppp_i$) from a known transmission power value of microphone handset so as to calculate the propagation path loss on microphone handset 2 whose received signal level is the weakest. Note that, in a wireless microphone system in which base unit 1 and microphone handsets 2 transmit a signal with the same transmission power, the propagation path loss to microphone handset 2 can be calculated using the transmission power of base unit 1 instead of the transmission power of microphone handset 2.

Transmission power control section 102a calculates the transmission power value for transmission of a control signal from base unit 1 in accordance with a value obtained by adding a received power reference value to the propagation path loss on microphone handset 2 whose received signal level is the weakest. The received power reference value is a value obtained by adding a margin to the received power value required to sustain communication between base unit 1 and microphone handset 2 or required to avoid an increase in communication interference. For example, when the RSSI level ($Ppp_i$) of the signal received from certain microphone handset 2 falls below the received power reference value, base unit 1 may stop controlling the transmission power and transmit the control signal with full power.

Transmission power control section 102a controls amplification section 104b so that the signal is transmitted with the calculated transmission power value. Moreover, transmission power control section 102a controls transmission power for each microphone handset 2 to transmit a call signal (and a control signal) with the calculated transmission power value. Transmission power control section 201a controls amplification section 203b so that a call signal (and a control signal) is transmitted with the transmission power value calculated by transmission power control section 102a.

Figure 6A:
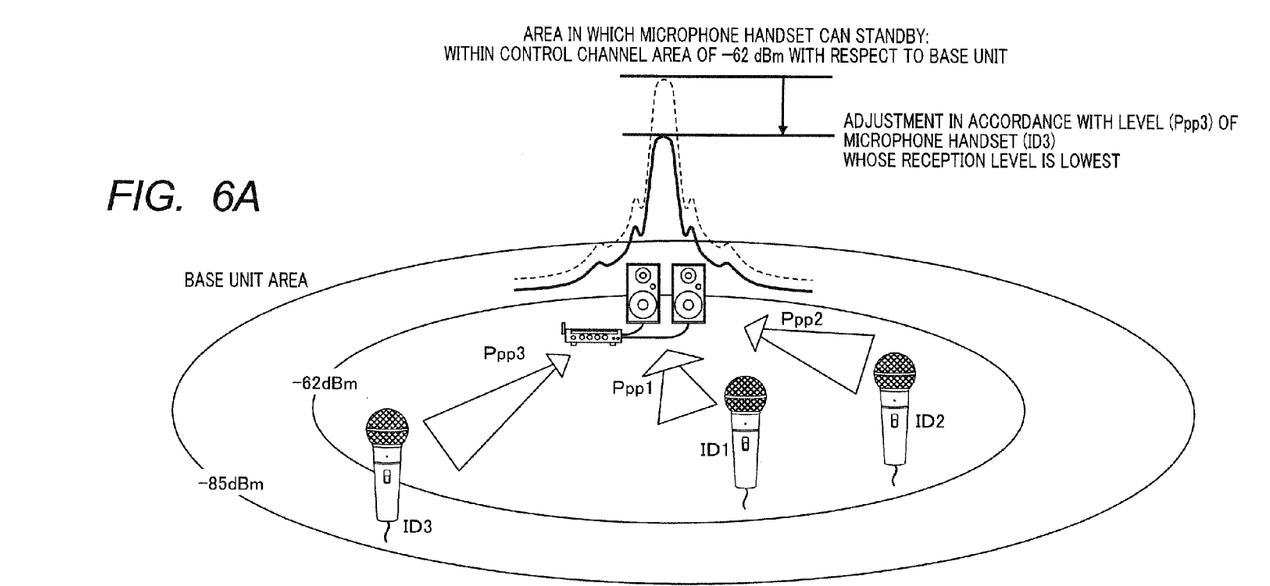
FIGS. 6A and 6B are diagrams illustrating how area adjustment of the control channel of the base unit according to an embodiment of the present invention is performed.
Figure 6B:
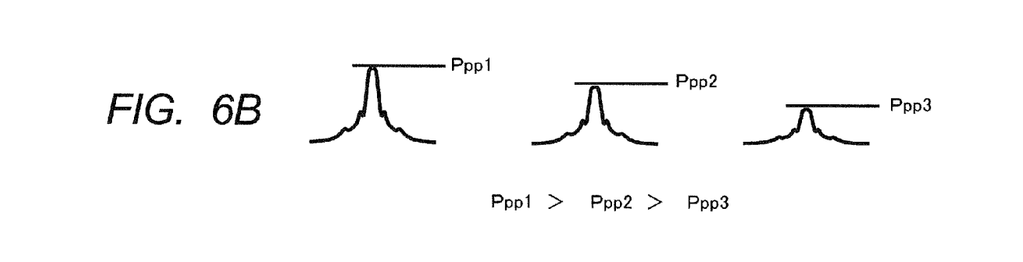

FIG. 6A and FIG. 6B illustrate how the signal receivable area is adjusted when the base unit transmits a control signal on a control channel in the present embodiment. Let us consider a case where the RSSI levels at the base unit for the call signals transmitted by microphone handsets with ID1, ID2, and ID3 are taken to be, respectively, $Ppp_1$, $Ppp_2$, and $Ppp_3$. In this case, if the RSSI levels of the call signals of the microphone handsets (ID1, ID2, and ID3) at the base unit are such that $Ppp_1 > PP_2 > Ppp_3$, the base unit calculates the transmission power value using the minimum value $Ppp_3$.

Thus, even a microphone handset that is distant from base unit 1 and that has a large propagation path loss can receive a control signal transmitted from base unit 1 on the control channel with a received power value required to sustain communication. In addition, the transmission power of base unit 1 is reduced in this case, so that an increase in radio interference to another radio communication system can be avoided.

As described above, according to the present embodiment, when performing TDMA-based radio communication with a plurality of microphone handsets, the base unit can control transmission power so that the received signal level of a microphone handset far from the base unit is set to an extent that slightly exceeds a predetermined threshold allowing the microphone handset to sustain communication. Thus, it is possible to sustain communication with all the microphone handsets while avoiding an increase in radio interference to a plurality of other radio communication systems as much as possible.

Although the present embodiment has been described for the case where the RSSI levels of received call signals are stored in memory section 103, the present invention is by no means limited to this case. More specifically, another value such as a propagation path loss may be calculated and stored beforehand, for example.

Moreover, although the present embodiment has been described for the case where the transmission power of microphone handsets 2 is determined based on the transmission power determined by base unit 1, the present invention is by no means limited to this case. More specifically, base unit 1 and microphone handsets 2 may exchange their control information such as transmission power information and both determine the transmission power based on the RSSI levels of the call signals and the control information.

INDUSTRIAL APPLICABILITY

The present invention is suitable for use in wireless microphone systems each including a base unit and a plurality of microphone handsets.

REFERENCE SIGNS LIST

1 Base unit
2 Microphone handset
101 External interface 102, 201 Signal processing section
102a, 201a Transmission power control section
103, 202 Memory section
104, 203 Radio section
104a Level measurement section
104b, 203b Amplification section
105, 204 Antenna
108, 208 Voice processing section
109 Speaker
207 Microphone

The invention claimed is:

1. A wireless microphone system comprising:
a plurality of microphone handsets; and
a base unit that performs time division multiple access (TDMA) based radio communication with the plurality of microphone handsets, wherein
the base unit comprises:
a level measurement section that measures a reception level of a signal transmitted from each of the microphone handsets; and
a transmission power control section that determines a transmission power value in accordance with a minimum value of the reception levels and that controls transmission power so that a predetermined signal is transmitted to the plurality of microphone handsets with the determined transmission power value using a predetermined channel.

2. The wireless microphone system according to claim 1, wherein the transmission power control section determines a transmission power value in accordance with a minimum value of the reception levels and controls transmission power so that a control signal is transmitted to the plurality of microphone handsets with the determined transmission power value using a control channel.

3. The wireless microphone system according to claim 1, wherein the transmission power control section determines a transmission power value in accordance with a minimum value of the reception levels and controls transmission power so that a call signal is transmitted to the plurality of microphone handsets with the determined transmission power value using a call channel.

4. The wireless microphone system according to claim 1, wherein the transmission power control section determines a transmission power value by calculation based on a propagation path loss on a microphone handset that has transmitted a signal whose measured reception level is a minimum value.

5. The wireless microphone system according to claim 1, wherein:
the base unit further comprises a memory that stores an ID of each of the microphone handsets with the reception level in association with each other; and
the transmission power control section performs calculation of the transmission power value at a timing when information stored in the memory is updated.

6. The wireless microphone system according to claim 5, wherein, at the timing, a reception level of a signal received last from each of the microphone handsets is stored in the memory.

7. A transmission power control method for a wireless microphone system including:
a plurality of microphone handsets; and a base unit that performs time division multiple access (TDMA) based radio communication with the plurality of microphone handsets, the method comprising:
measuring by the base unit, a reception level of a signal transmitted from each of the microphone handsets; and
determining by the base unit, a transmission power value in accordance with a minimum value of the reception levels, and controlling transmission power by the base unit so that a predetermined signal is transmitted to the plurality of microphone handsets with the determined transmission power value using a predetermined channel.

* * * * *